United States Patent [19]

Worbois

[11] Patent Number: 4,626,039
[45] Date of Patent: Dec. 2, 1986

[54] RAILWAY VEHICLE PENALTY BRAKE CONTROL SYSTEM

[75] Inventor: Robert J. Worbois, N. Huntingdon, Pa.

[73] Assignee: American Standard Inc., Wilmerding, Pa.

[21] Appl. No.: 705,940

[22] Filed: Feb. 22, 1985

[51] Int. Cl.$^4$ ............................................. B60T 7/14
[52] U.S. Cl. ........................................ 303/19; 303/13
[58] Field of Search ...................... 303/19, 20, 13, 14; 246/186, 189 R, 167 R; 200/61, 86, 81 R, 81 H, 83 R

[56] References Cited

U.S. PATENT DOCUMENTS

| | | | |
|---|---|---|---|
| 2,961,274 | 11/1960 | McClure et al. | 303/19 |
| 3,160,444 | 12/1964 | Linhart | 303/19 |
| 3,656,814 | 4/1972 | Scheele et al. | 303/19 |

Primary Examiner—Douglas C. Butler
Assistant Examiner—Alvin Oberley
Attorney, Agent, or Firm—G. J. Falce

[57] ABSTRACT

A penalty brake control system for a railway vehicle equipped with a straight air-type brake valve device is arranged so that failure of the vehicle operator to indicate his alertness and/or well-being by maintaining a foot valve pedal depressed results in an automatic penalty brake application. Pressure in a volume reservoir exhausts through a whistle to evoke a warning of an impending penalty brake application any time the foot valve pedal is released. When the volume reservoir pressure drops below a first predetermined value, an interlock pilot valve is operated to connect the volume reservoir pressure to exhaust at the brake valve device. A penalty pilot valve subject to volume reservoir pressure initiates a penalty brake application when the volume reservoir pressure drops below a second predetermined pressure. Brake application pressure in excess of this second predetermined pressure is connected to the penalty pilot valve in parallel with the volume reservoir pressure to suppress the penalty application of a brake application is in effect through the normal brake circuit.

10 Claims, 1 Drawing Figure

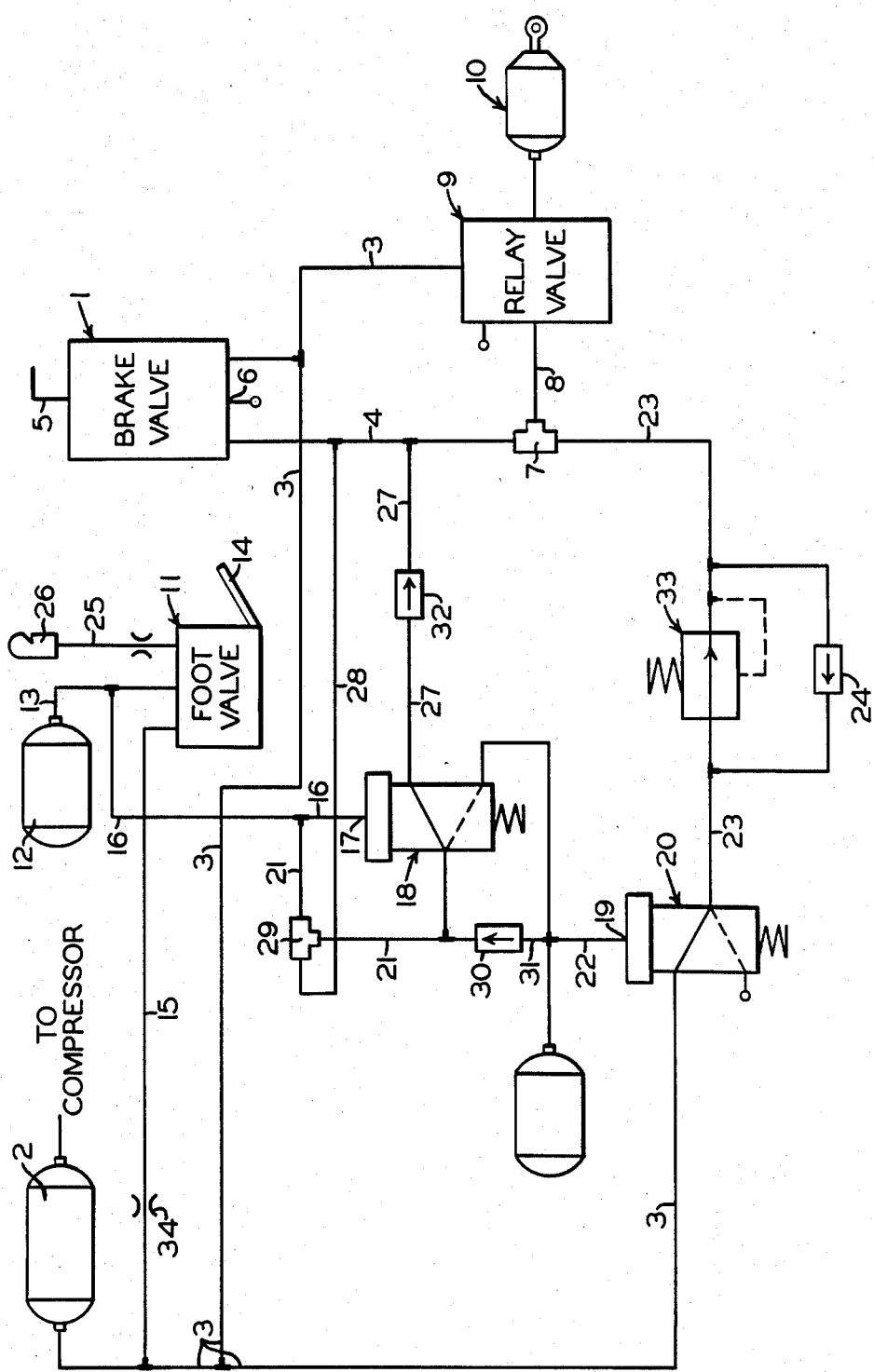

RAILWAY VEHICLE PENALTY BRAKE CONTROL SYSTEM

BACKGROUND OF THE INVENTION

The present invention relates to penalty brake control systems for railway locomotives and, in particular, to such locomotives employing a straight air-type locomotive brake valve device.

Penalty brake control systems have been typically employed on locomotives having automatic-type brake equipments, such as the well-known, standard 26-L Locomotive Brake Equipment manufactured by the Westinghouse Air Brake Company. This automatic-type brake equipment is employed where a locomotive is used to haul a train of cars, since the locomotive brake valve device operates to vary brake pipe pressure, which in turn controls the car control valves and thereby provides substantially synchronized braking throughout the train.

Locomotives or power cars used as service vehicles, such as track inspection vehicles and the like, are typically single-unit vehicles equipped with a straight air-type brake system, which employs the well-known, standard, SA-2 or SA-7 type brake valve device also manufactured by the Westinghouse Air Brake Company. The straight air-type brake valve device controls brake pressure directly, without regulating a train line control pressure, as in the counterpart 26-type valve device. Since these locomotives are not used to haul cars, there is no requirement to provide interrelated locomotive/car control functions, thus making it advantageous to employ a straight air-type brake valve device, because of its lower cost as compared to a 26-type automatic brake valve device.

However, it is desirable to continuously monitor the locomotive operator's alertness and well-being in these single-unit service cars, as well as in locomotives hauling a train of cars.

BRIEF SUMMARY OF THE INVENTION

It is therefore an object of the invention to provide a penalty brake control system for use with a straight air-type brake valve device.

A further object of the invention is to provide a penalty brake control system in which a penalty brake application is automatically imposed when the vehicle operator is detected as incapacitated or inattentive to the requirement to maintain a foot pedal depressed as an indication of his alertness.

A still further object of the invention is to suppress an impending penalty brake application by the application of the locomotive brakes in a normal manner.

A final object of the invention is to prevent release of a penalty brake application until a full service brake application is made to bring the vehicle to a complete stop.

These objectives are accomplished in a preferred embodiment of the present invention utilizing a dual-path brake circuit via which brake pressure is controlled in accordance with normal service operation of the locomotive brake valve device in one path of the brake circuit or operation of a foot valve device in conjunction with first and second pilot valves in the other path of the brake circuit. The locomotive brake valve device is basically a self-lapping type regulating valve capable of establishing brake pressure in proportion to the degree of handle movement into the brake application zone. The foot valve device is pedal-operated to connect a volume reservoir to either a source of compressed air or to a warning whistle depending upon whether the foot pedal is depressed or not.

As long as the foot pedal is depressed, indicative of the operator's alertness and/or well-being, the volume reservoir is in a charged condition, cut off from the warning whistle. The control chamber of the first pilot valve is subject to this volume reservoir pressure to cut off a source of compressed air from the brake means.

If the foot pedal is released for any reason, the volume reservoir pressure blows down through the warning whistle. The resultant reduction of volume reservoir pressure initiates an impending penalty brake application. In the event the brake valve device is providing brake pressure at the time, this brake pressure is connected to the control chamber of the first pilot valve in parallel with the volume reservoir pressure to maintain the first pilot valve device in its cut-off position, thus suppressing a penalty brake application.

In the absence of brake application pressure or brake application pressure less than a predetermined value corresponding to the pressure at which the first pilot valve is actuated, a second pilot valve connects the first pilot valve control pressure to atmosphere at the brake valve, thus requiring operation of the brake valve to obtain brake pressure in excess of the predetermined value in order to release the penalty brake application.

BRIEF DESCRIPTION OF THE DRAWING

The foregoing objectives, as well as other advantages of the invention will become apparent from the following detailed explanation when taken in conjunction with the single FIGURE drawing showing a diagrammatic arrangement of a preferred embodiment of the invention.

DESCRIPTION AND OPERATION

The penalty brake control system of the present invention is intended for use on a service-type locomotive having a straight air-type brake valve device 1, such as the aforementioned SA-2 or SA-7 straight air brake valve. This brake valve device 1 has, as its source of compressed air, the locomotive main reservoir 2, which is connected to brake valve device 1 by conduit 3. The self-lapping unit (not shown) of brake valve device 1 regulates the pressure in a conduit 4, according to the position of the brake valve handle 5, by supplying service brake control pressure thereto from conduit 3 or exhausting pressure therefrom via an exhaust port 6. Conduit 4 is connected to one inlet of a double check valve 7, the outlet of which is connected by a conduit 8 to the control port of a relay valve device 9, such as a standard, well-known J-type relay valve manufactured by the Westinghouse Air Brake Company. The relay valve outlet is connected to a conventional-type brake cylinder device 10, which is pressurized according to the pressure delivered to the relay valve control port by brake valve device 1. This control of brake cylinder pressure by brake valve device 1 constitutes the normal circuit for operating the vehicle brakes in accordance with the well-known straight air concept of brake control.

In a penalty brake control circuit, there is provided a foot valve device 11, such as a standard, well-known D-1 type foot valve manufactured by the Westinghouse Air Brake Company. A volume reservoir 12 is connected to the delivery port of foot valve device 11 by a conduit 13. In the depressed position of foot valve pedal 14, which position the operator is required to establish and maintain to indicate his alertness and/or well-being, conduit 13 is connected to a conduit 15 leading to main reservoir 2, so as to charge volume reservoir 12.

A branch conduit 16 of conduit 13 connects the compressed air from reservoir volume 12 to the control port 17 of a two-position, three-connection, pneumatic pilot valve device 18. As long as this pressure exceeds a first predetermined value, valve device 18 is actuated to make the connection represented in the drawing by the dotted line of the valve envelope symbol. Volume reservoir pressure is thus connected to the control port 19 of another two-position, three-connection, pneumatic pilot valve device 20 via a branch conduit 21 of conduit 16 and a conduit 22. These pilot valve devices 18, 20 may be well-known, conventional H-5 type Relayair Valves manufactured by the Westinghouse Air Brake Company. When the pressure at control port 19 exceeds a second predetermined value, e. g., 5 psi. less than the first predetermined value, valve device 20 is actuated to make the connection represented in the drawing by the dotted line in the valve envelope symbol. In this position, a conduit 23, connected to the other inlet of double check valve 7, is vented to atmosphere via a one-way check valve 24 and the exhaust port of actuated pilot valve device 20. Accordingly, the penalty brake control circuit is maintained in a vented condition as long as the pressure of volume reservoir 12 exceeds the predetermined value at which pilot valve device 20 is set to actuate. As an example, the predetermined value at which pilot valve device 18 is set to actuate may be 85 psi. and the predetermined value at which pilot valve device 20 is set to actuate may be 80 psi. These predetermined values are less than the maximum pressure for which brake valve device 1 is adjusted, such as 90 psi.

In the event foot valve pedal 14 is released by the operator, either due to his being incapacitated or negligent, the foot valve device 11 will assume a position in which conduit 13 is connected to a conduit 25 having a warning whistle 26. Consequently, charging of volume reservoir 12 is cut off and the volume reservoir pressure is vented via warning whistle 25 to evoke an audible warning of an impending penalty brake application. As the pressure in volume reservoir 12 is reduced by exhausting through warning whistle 26, a timing period is established, which is defined by the time required for the volume reservoir pressure to blow down to the predetermined actuating pressure of pilot valve device 18. During this warning period, foot valve pedal 14 can be depressed to prevent the impending penalty brake application from occurring. If the operator fails to acknowledge the warning whistle during this warning period by depressing the foot valve pedal, the loss of pilot pressure at control port 17 results in pilot valve device 18 being shifted to a position represented by the solid lines in the valve envelope symbol, thereby cutting off the supply of volume reservoir pressure to the control port 19 of pilot valve device 20, and connecting this pressure to a conduit 27 that is connected to conduit 4. In the normal release position of brake valve device 1, conduit 4 is vented to atmosphere via a connection within the brake valve leading to exhaust port 6.

This provides an interlock feature that prevents the operator from suppressing an impending penalty application (by depressing the foot valve pedal) following expiration of the warning period. In the shifted position of pilot valve device 18, volume reservoir 12 is connected to atmosphere at brake valve device 1 via conduits 13, 16, and 21, double check valve 29, conduit 21, pilot spool valve device 18, conduit 27, one way check valve 32, conduit 4, and the brake valve exhaust port 6. Thus, even if pedal 14 of foot valve 11 is depressed to connect main reservoir pressure from conduit 15 to conduit 13 and volume reservoir 12, the afore-mentioned interlock connection will preclude charging of reservoir 12 to a pressure sufficient to reset pilot valve device 18. In this way, suppression of a penalty brake application by depressing the foot valve pedal is not possible after the warning period has expired. However, a penalty application can still be suppressed by operating brake valve handle 5 to provide a service brake application (via the normal brake circuit) of such magnitude as to prevent dissipation of control pressure at pilot valve device 20, as hereinafter explained.

With handle 5 of brake valve device 1 positioned in the brake application zone, such that the pressure in conduit 4 exceeds the predetermined value at which pilot valve device 20 is set to actuate, this pressure in conduit 4 is connected via a conduit 28 and a double check valve 29 in conduit 21 to the downstream side of a one-way check valve 30 in a bypass conduit 31 that connects conduits 21 and 22 in parallel with the connection therebetween by pilot valve 18 (dotted line). Accordingly, the control pressure at port 19 of pilot valve device 20 is prevented from being dissipated below the pressure in conduit 4, thus maintaining pilot valve device 20 in its actuated condition. It will be appreciated therefore that by operating brake valve 1 to provide brake application pressure in excess of approximately 80 psi., corresponding to the actuating pressure of pilot valve 20, during or immediately following expiration of the warning period, a penalty brake application can still be suppressed. It will be appreciated, however, that the degree of brake application required to suppress an impending penalty brake application, as above explained, is sufficient to bring the vehicle to a safe halt.

In order to reset the system to release the brakes, foot valve pedal 14 must be depressed, so that volume reservoir 12 is cut off from whistle 26 and accordingly is recharged. At approximately 85 psi., pilot valve 18 is reset, in turn connecting volume reservoir pressure to control port 19 (dotted connection) of pilot valve device 20. This control pressure, being at least 85 psi., is sufficient to maintain pilot valve device 20 in its reset position and thereby permit movement of brake valve handle 5 to release position without a penalty application occurring. The effective brake cylinder control pressure at relay valve 9 is thus exhausted to in turn release the service brake cylinder pressure.

When brake application pressure is less than the control pressure required to actuate pilot valve device 20, i.e., less than 80 psi., or the brake valve device is in release position so that the brake application pressure in conduit 4 is completely exhausted at the time the warning whistle is sounded, the volume reservoir pressure is reduced to the level of the effective brake application pressure via conduit 16, conduit 21, double check valve 29, pilot valve device 18, conduit 27, a one-way check valve 32, conduit 4, and the brake valve exhaust port 6. This allows pilot pressure at control port 19 of pilot valve device 20 to be dissipated with the volume reservoir pressure, whereby pilot valve 20 is switched to a position represented by the solid line in the valve envelope symbol, when the control pressure drops below approximately 80 psi. In the switched position of pilot valve device 20, pressure in main reservoir 2 is connected to a conventional-type regulating valve 33 in conduit 23 of the penalty control circuit. The regulating valve is adjusted to provide output pressure, as desired, for the penalty brake application. Typically, this pressure would correspond to the maximum pressure produced by brake valve device 1, that is 90 psi., and is supplied via double check valve 7 to conduit 8 and the control port of relay valve device 9, which operates to pressurize brake cylinder 10 in accordance with the penalty brake application.

The aforementioned penalty brake application can only be released by movement of brake valve handle 5 to a position in the brake application zone corresponding to at least 85 psi. brake application pressure, while foot valve pedal 14 is concurrently depressed to reestablish the connection between conduits 13 and 15. With the pressure in conduit 4 eing at least 85 psi., pressure supplied to volume reservoir 12 from main reservoir 2 is able to build up at control port 17 of pilot valve device 18, since the fluid pressure in conduits 21 and 27 is unable to exhaust at brake valve exhaust port 6. When this build-up of pressure at control port 17 reaches 85 psi., pilot valve device 18 is actuated to the position represented by the dotted line in the valve envelope symbol. In this position, volume reservoir pressure is, in turn, connected to control port 19 of pilot valve device 20 to reset this pilot valve 20. In this position of pilot valve 20, as represented by the dotted line in the valve envelope symbol, conduit 23 is connected to atmosphere to exhaust the regulating valve supply pressure in conduit 23. This allows the penalty brake control pressure at the penalty control circuit side of double check valve 7 to be exhausted via one-way check valve 24, conduit 23, and pilot valve 20.

This requirement to move brake valve handle 5 sufficiently to provide brake application pressure in the normal brake circuit in excess of 85 psi. is intended to assure complete stopping of the vehicle before the penalty application can be released. A control choke 34 is provided in conduit 15 between main reservoir 2 and foot valve device 11. The purpose of this control choke is to prevent a buildup of pressure at control port 17 of pilot valve device 18, in the event foot valve pedal 14 is depressed following a penalty brake application without concurrently operating brake valve device 1 to application position. Accordingly, pilot valve device 18 is prevented from being inadvertently reset to prematurely release a penalty application.

Having thus described the invention, what I claim as new and desire to secure by Letters Patent, is:

1. A railway vehicle brake control system including braking means, an operator's brake valve device operative to provide service brake control pressure according to the selected position of an operating handle thereof in a brake application zone, and a source of fluid under pressure comprising:
   (a) a reservoir;
   (b) penalty control means for connecting said source of fluid under pressure to said reservoir in a first position and for venting said reservoir in a second position;
   (c) a first double check valve device via which either said service brake control pressure or said penalty brake control pressure is connected to said braking means;
   (d) a first pilot valve device including a control port subject to said reservoir fluid under pressure, an inlet connected to said source of fluid under pressure, an outlet connected to said first double check valve device, and an exhaust port, said first pilot valve device having an actuated position in which said inlet is connected to said outlet in response to said reservoir fluid under pressure being reduced below a first predetermined value to thereby provide penalty brake control pressure, and having a reset position in which said outlet is connected to said exhaust port in response to said reservoir fluid under pressure exceeding said first predetermined pressure to thereby exhaust said penalty brake control pressure;
   (e) suppression means for preventing operation of said first pilot valve device to said actuated position when said service brake control pressure exceeds said first predetermined value; and
   (f) interlock means for preventing operation of said first pilot valve device from said actuated position to said reset position when said penalty control means is in said second position comprising:
      (i) a second pilot valve device having a control port, an inlet, a first outlet, and a second outlet, said second pilot valve device being operable to an actuated position in response to said reservoir fluid under pressure being less than a second predetermined value, wherein said inlet thereof is connected to said second outlet thereof, and being operable to a reset position in response to said reservoir fluid under pressure exceeding said second predetermined value, wherein said inlet thereof is connected to said first outlet thereof;
      (ii) a first conduit between said reservoir and said control port of said second pilot valve device;
      (iii) a second conduit between said first conduit and said inlet of said second pilot valve device; and
      (iv) a third conduit between said brake valve device and said first double check valve device having said service brake control pressure, said reservoir fluid under pressure being exhausted via said brake valve device when said service brake control pressure is less than said reservoir fluid under pressure, whereby said second pilot valve is prevented from being operated to said reset position until said service brake control pressure exceeds said second predetermined value.

2. A brake control system, as recited in claim 1, further comprising regulating valve means for limiting the maximum fluid under pressure connected from said outlet of said first pilot valve device to said brake means.

3. A brake control system, as recited in claim 2, further comprising a one-way check valve in parallel with said regulating valve means to connect fluid under pressure from said first double check valve device to atmosphere via said exhaust port when said first pilot valve device is in said reset position.

4. A brake control system, as recited in claim 1, wherein said first predetermined value is less than said second predetermined value.

5. A brake control system, as recited in claim 1, further comprising:

(a) a fourth conduit between said third conduit and said second outlet of said second pilot valve device; and (b) a first one-way check valve in said fourth conduit to prevent flow of fluid under pressure from said fourth conduit to said second outlet of said second pilot valve device.

6. A brake control system, as recited in claim 5, further comprising:

(a) a fifth conduit between said first outlet of said second pilot valve device and said control port of said first pilot valve device;

(b) a sixth conduit connected between said second and fifth conduits in parallel with said second pilot valve device; and (c) a second one-way check valve device in said sixth conduit to prevent flow of fluid under pressure from said second conduit to said third conduit in bypass of said second pilot valve device when said second pilot valve device is in said second position.

7. A brake control system, as recited in claim 1, wherein said penalty control means comprises a pedally-operated, two-position, three-connection valve device, a first one of said three connections being with said source of fluid under pressure, a second being with said reservoir, and a third being to atmosphere.

8. A brake control system, as recited in claim 7, further characterized in that said pedally-operated valve device establishes fluid pressure communication between said first and second connections in said first position thereof, and establishes fluid pressure communication between said second and third connections in said second position thereof.

9. A brake control system, as recited in claim 7, wherein said penalty control means further comprises a whistle via which said third connection of said pedally-operated valve device is connected to atmosphere.

10. A brake control system, as recited in claim 7, further comprising a fluid pressure restriction via which said source of fluid under pressure is connected to said reservoir in said first position of said pedally-operated valve device.

* * * * *